(12) United States Patent
Kingham et al.

(10) Patent No.: US 7,085,759 B2
(45) Date of Patent: Aug. 1, 2006

(54) SYSTEM AND METHOD FOR COMMUNICATING DATA TO A PROCESS

(75) Inventors: Ian Kingham, Perth (GB); Alex Loucaides, Bedfordshire (GB)

(73) Assignee: JPMorgan Chase Bank, New York, NY (US)

( * ) Notice: Subject to any disclaimer, the term of this patent is extended or adjusted under 35 U.S.C. 154(b) by 465 days.

(21) Appl. No.: 10/313,525

(22) Filed: Dec. 6, 2002
(Under 37 CFR 1.47)

(65) Prior Publication Data
US 2004/0111416 A1   Jun. 10, 2004

(51) Int. Cl.
G06F 17/00 (2006.01)
G06F 7/00 (2006.01)
(52) U.S. Cl. ...................... 707/4; 707/103 R
(58) Field of Classification Search .................... 707/3, 707/9, 10, 104.1, 4, 103 R, 103 Y, 104; 710/33, 710/36, 65, 260; 712/23, 200, 210; 709/218, 709/219; 412/23, 210
See application file for complete search history.

(56) References Cited

U.S. PATENT DOCUMENTS

| | | | |
|---|---|---|---|
| 4,751,702 A | 6/1988 | Beier et al. | |
| 5,027,269 A | 6/1991 | Grant et al. | |
| 5,159,687 A | 10/1992 | Richburg | |
| 5,301,320 A | 4/1994 | McAtee et al. | |
| 5,325,527 A | 6/1994 | Cwikowski et al. | |
| 5,499,371 A | 3/1996 | Henninger et al. | |
| 5,539,885 A | 7/1996 | Ono et al. | |
| 5,553,235 A | 9/1996 | Chen et al. | |
| 5,566,297 A | 10/1996 | Devarakonda | |
| 5,594,863 A | 1/1997 | Stiles | |
| 5,630,047 A | 5/1997 | Wang | |
| 5,630,173 A | 5/1997 | Oprescu | |
| 5,673,403 A | 9/1997 | Brown et al. | |
| 5,689,698 A | 11/1997 | Jones et al. | |
| 5,692,181 A | 11/1997 | Anand et al. | |
| 5,712,971 A | 1/1998 | Stanfill et al. | |
| 5,734,887 A | 3/1998 | Kingberg et al. | |
| 5,737,592 A | 4/1998 | Nguyen et al. | |
| 5,761,499 A | 6/1998 | Sonderegger | |
| 5,768,119 A | 6/1998 | Havekost et al. | |
| 5,778,198 A * | 7/1998 | Kadota ....................... 710/106 |
| 5,784,557 A | 7/1998 | Oprescu | |
| 5,790,809 A | 8/1998 | Holmes | |
| 5,801,689 A | 9/1998 | Huntsman | |

(Continued)

FOREIGN PATENT DOCUMENTS

WO   WO 01/35209   5/2001

(Continued)

OTHER PUBLICATIONS

Unknown, Conjuring up COM through scripting.

(Continued)

Primary Examiner—Greta Robinson
Assistant Examiner—Jacques Veillard
(74) Attorney, Agent, or Firm—Hunton & Williams LLP (57) ABSTRACT

A method for communicating with a process. The method receives a request including a target data identifier and a process identifier, retrieves target data including an target data type from a database based on the received target data identifier, selects instructions based on the target data type and the process identifier, generates a data object and populating the data object with the retrieved target data according to the selected instructions, and transmits the generated data object to a process corresponding to the received process identifier.

17 Claims, 3 Drawing Sheets

U.S. PATENT DOCUMENTS

| | | | |
|---|---|---|---|
| 5,806,075 A | 9/1998 | Jain et al. | |
| 5,845,292 A | 12/1998 | Bohannon et al. | |
| 5,852,812 A * | 12/1998 | Reeder | 705/39 |
| 5,875,466 A * | 2/1999 | Wakerly | 711/138 |
| 5,899,990 A | 5/1999 | Maritzen et al. | |
| 5,926,637 A | 7/1999 | Cline et al. | |
| 5,930,768 A | 7/1999 | Hooban | |
| 5,937,198 A | 8/1999 | Nelson et al. | |
| 5,937,402 A | 8/1999 | Pandit | |
| 5,946,458 A | 8/1999 | Austin et al. | |
| 5,949,412 A | 9/1999 | Huntsman | |
| 5,960,200 A | 9/1999 | Eager et al. | |
| 5,960,445 A | 9/1999 | Tamori et al. | |
| 5,964,864 A * | 10/1999 | Tamai | 712/34 |
| 5,987,247 A | 11/1999 | Lau | |
| 5,999,179 A | 12/1999 | Kekic et al. | |
| 6,003,075 A | 12/1999 | Arendt et al. | |
| 6,009,274 A | 12/1999 | Fletcher et al. | |
| 6,009,405 A | 12/1999 | Leymann et al. | |
| 6,011,916 A | 1/2000 | Moore et al. | |
| 6,046,742 A | 4/2000 | Chari | |
| 6,052,456 A | 4/2000 | Huang | |
| 6,065,009 A | 5/2000 | Leymann et al. | |
| 6,101,489 A | 8/2000 | Lannert et al. | |
| 6,101,601 A | 8/2000 | Matthews et al. | |
| 6,108,698 A | 8/2000 | Tenev et al. | |
| 6,148,296 A | 11/2000 | Tabbara | |
| 6,163,776 A | 12/2000 | Periwal | |
| 6,173,439 B1 | 1/2001 | Carlson et al. | |
| 6,178,409 B1 | 1/2001 | Weber et al. | |
| 6,184,996 B1 | 2/2001 | Gase | |
| 6,185,613 B1 | 2/2001 | Lawson et al. | |
| 6,188,400 B1 | 2/2001 | House et al. | |
| 6,195,676 B1 | 2/2001 | Spix et al. | |
| 6,230,319 B1 | 5/2001 | Britt, Jr. et al. | |
| 6,246,410 B1 | 6/2001 | Bergeron et al. | |
| 6,249,877 B1 | 6/2001 | Kawakami et al. | |
| 6,253,193 B1 | 6/2001 | Ginter et al. | |
| 6,256,635 B1 | 7/2001 | Arrouye et al. | |
| 6,272,556 B1 | 8/2001 | Gish | |
| 6,282,698 B1 | 8/2001 | Baker et al. | |
| 6,288,790 B1 | 9/2001 | Yellepeddy et al. | |
| 6,289,336 B1 | 9/2001 | Melton et al. | |
| 6,298,353 B1 | 10/2001 | Apte | |
| 6,304,871 B1 | 10/2001 | Gajda et al. | |
| 6,311,320 B1 | 10/2001 | Jibbe | |
| 6,314,430 B1 | 11/2001 | Chang | |
| 6,317,738 B1 | 11/2001 | Lohman et al. | |
| 6,324,525 B1 | 11/2001 | Kramer et al. | |
| 6,332,161 B1 | 12/2001 | Sasson | |
| 6,353,820 B1 | 3/2002 | Edwards et al. | |
| 6,363,363 B1 | 3/2002 | Haller et al. | |
| 6,363,499 B1 | 3/2002 | Delo et al. | |
| 6,381,609 B1 | 4/2002 | Breitbart et al. | |
| 6,430,556 B1 | 8/2002 | Goldberg et al. | |
| 6,438,749 B1 | 8/2002 | Chamberlain | |
| 6,442,533 B1 | 8/2002 | Hinkle | |
| 6,442,748 B1 | 8/2002 | Bowman-Amuah | |
| 6,453,127 B1 | 9/2002 | Wood et al. | |
| 6,453,310 B1 | 9/2002 | Zander | |
| 6,463,343 B1 | 10/2002 | Emens et al. | |
| 6,463,439 B1 | 10/2002 | Dahlberg | |
| 6,467,079 B1 | 10/2002 | Ettritch et al. | |
| 6,470,384 B1 | 10/2002 | O'Brian et al. | |
| 6,473,786 B1 | 10/2002 | Scouras et al. | |
| 6,477,580 B1 | 11/2002 | Bowman-Amuah | |
| 6,477,590 B1 | 11/2002 | Habusha et al. | |
| 6,480,860 B1 | 11/2002 | Monday | |
| 6,480,894 B1 | 11/2002 | Courts et al. | |
| 6,484,310 B1 | 11/2002 | Przybylski et al. | |
| 6,502,095 B1 | 12/2002 | Breitbart et al. | |
| 6,502,207 B1 | 12/2002 | Itoh et al. | |
| 6,505,238 B1 | 1/2003 | Tran | |
| 6,510,352 B1 | 1/2003 | Badavas et al. | |
| 6,518,983 B1 | 2/2003 | Grohmann et al. | |
| 6,526,571 B1 | 2/2003 | Aizikowitz et al. | |
| 6,539,337 B1 | 3/2003 | Provan et al. | |
| 6,546,419 B1 | 4/2003 | Humpleman et al. | |
| 6,553,428 B1 | 4/2003 | Ruehle et al. | |
| 6,557,039 B1 | 4/2003 | Leong et al. | |
| 6,571,282 B1 | 5/2003 | Bowman-Amuah | |
| 6,571,389 B1 | 5/2003 | Spyker et al. | |
| 6,578,068 B1 | 6/2003 | Bowman-Amuah | |
| 6,584,497 B1 | 6/2003 | Case et al. | |
| 6,590,587 B1 | 7/2003 | Wichelman et al. | |
| 6,615,258 B1 | 9/2003 | Barry et al. | |
| 6,643,679 B1 | 11/2003 | Erickson et al. | |
| 6,654,784 B1 | 11/2003 | Wei | |
| 6,657,625 B1 | 12/2003 | Chik et al. | |
| 6,675,228 B1 | 1/2004 | Bahrs et al. | |
| 6,681,380 B1 | 1/2004 | Britton et al. | |
| 6,697,835 B1 | 2/2004 | Hanson et al. | |
| 6,701,514 B1 | 3/2004 | Haswell et al. | |
| 6,714,219 B1 | 3/2004 | Lindhorst et al. | |
| 6,823,358 B1 * | 11/2004 | Spender | 709/203 |
| 2001/0020255 A1 | 9/2001 | Hofmann et al. | |
| 2001/0029604 A1 | 10/2001 | Dreyband et al. | |
| 2002/0010867 A1 | 1/2002 | Schaefer et al. | |
| 2002/0046239 A1 | 4/2002 | Stawikowski et al. | |
| 2002/0062475 A1 | 5/2002 | Iborra et al. | |
| 2002/0069192 A1 | 6/2002 | Aegerter | |
| 2002/0078115 A1 | 6/2002 | Poff et al. | |
| 2002/0103835 A1 | 8/2002 | Kearney | |
| 2002/0109718 A1 | 8/2002 | Mansour et al. | |
| 2002/0111995 A1 | 8/2002 | Mansour et al. | |
| 2002/0111999 A1 | 8/2002 | Andersson | |
| 2002/0116205 A1 | 8/2002 | Ankireddipally et al. | |
| 2002/0120685 A1 | 8/2002 | Srivastava et al. | |
| 2002/0124113 A1 | 9/2002 | Gargya et al. | |
| 2002/0129096 A1 | 9/2002 | Mansour et al. | |
| 2002/0133579 A1 | 9/2002 | Bernhardt et al. | |
| 2002/0143721 A1 | 10/2002 | Charlet et al. | |
| 2002/0143819 A1 | 10/2002 | Han et al. | |
| 2002/0144101 A1 | 10/2002 | Wang et al. | |
| 2002/0178191 A1 | 11/2002 | Sleiken | |
| 2002/0178434 A1 | 11/2002 | Fox et al. | |
| 2002/0188765 A1 | 12/2002 | Fong et al. | |
| 2002/0188928 A1 | 12/2002 | Szpak et al. | |
| 2003/0009323 A1 | 1/2003 | Adeli | |
| 2003/0027561 A1 | 2/2003 | Iyer | |
| 2003/0028555 A1 | 2/2003 | Young et al. | |
| 2003/0033121 A1 | 2/2003 | Chen et al. | |
| 2003/0033159 A1 | 2/2003 | Altomare | |
| 2003/0036809 A1 | 2/2003 | Landman et al. | |
| 2003/0046317 A1 | 3/2003 | Cseri et al. | |
| 2003/0050897 A1 | 3/2003 | Altornare | |
| 2003/0069907 A1 | 4/2003 | Moreau et al. | |
| 2003/0084067 A1 | 5/2003 | Obiaya | |
| 2003/0093574 A1 | 5/2003 | Fablet et al. | |
| 2003/0097383 A1 | 5/2003 | Smirnov et al. | |
| 2003/0140045 A1 | 7/2003 | Heninger et al. | |
| 2003/0160813 A1 | 8/2003 | Raju | |
| 2003/0217033 A1 | 11/2003 | Sandler et al. | |
| 2003/0229554 A1 * | 12/2003 | Veres et al. | 705/35 |
| 2004/0107183 A1 | 6/2004 | Mangan | |
| 2004/0230587 A1 | 11/2004 | Doddington | |
| 2005/0030555 A1 | 2/2005 | Phenix et al. | |

FOREIGN PATENT DOCUMENTS

| | | |
|---|---|---|
| WO | WO 01/63529 | 8/2001 |

| | | |
|---|---|---|
| WO | WO 02/46916 | 6/2002 |
| WO | WO 02/046980 | 6/2002 |
| WO | WO 03/001373 | 1/2003 |

OTHER PUBLICATIONS

Rennhackkamp, One For The Road: Sybase's Adaptive Server Anywhere 6.0.

McClanahan, PowerBuilder3.0.

White, Quantum SPC/DC Script File (.tdf) Definition Instruction Guide.

Myers, Scripting Graphical Applications by Demonstration.

Ousterhout, Scripting Higher Level Programming.

* cited by examiner

SYSTEM AND METHOD FOR COMMUNICATING DATA TO A PROCESS

BACKGROUND

1. Technical Field

The present disclosures relates to a system and method for communicating data to a process. More specifically, the present disclosure relates to a system and method for controlling communication of data from a database to a process using directives.

2. Description of the Related Art

In software engineering, the Model-View-Controller paradigm (MVC) has gained favor as a beneficial way of structuring applications, as it isolates three aspects of an application such that one aspect may be changed without requiring alteration of the other aspects.

The Model aspect of MVC relates to the data which may be accessed and/or manipulated. The View aspect of MVC relates to the part of the software that processes that data and presents results of the processing to the user. The Controller aspect of MVC relates to the part of the software that acts as an interface between the Model and the View.

The View portion of a software application may include, for example, engines for processing the data, as well as a graphical user interface (GUI) providing audio/visual presentation. It is possible that, for example, a first user may wish to process and view data in an arrangement different from that of a second user. In order to satisfy both users, under the MVC paradigm, the View may be altered, but the controller and the data model may remain unchanged. A problem occurs when the second View can not process data presented in the same format as the original View. This problem may be solved by using a Controller that can present data in a manner which accommodates multiple Views.

Therefore, in order to effectively achieve this degree of modularity, it is desirable to have a system in which the Controller is capable of providing operational transparency between a plurality of Models and Views.

SUMMARY

The present disclosure relates to a method for communicating with a process, comprises, receiving a request including a target data identifier and a process identifier, retrieving target data including an target data type from a database based on the received target data identifier, selecting instructions based on the target data type and the process identifier, generating a data object and populating the data object with the retrieved target data according to the selected instructions, and transmitting the generated data object to a process corresponding to the received process identifier. The step of selecting instructions may include parsing the target data retrieved from the database, determining a target data class based on one of the target data and the target data identifier, identifying objects within the parsed target data, accessing meta-data which defines a structure of the target data class, and selecting instructions from an instruction set based on the identified objects, the process, and the meta-data.

BRIEF DESCRIPTION OF THE DRAWINGS

A more complete appreciation of the present disclosure and many of the attendant advantages thereof will be readily obtained as the same becomes better understood by reference to the following detailed description when considered in connection with the accompanying drawings, wherein.

DETAILED DESCRIPTION

In describing a preferred embodiment of the present disclosure illustrated in the drawings, specific terminology is employed for sake of clarity. The present disclosure is not intended to be limited to the specific terminology so selected, and it is to be understood that each specific element includes all technical equivalents which operate in a similar manner. It will be apparent to one skilled in the art that the system and method of the present disclosure are not limited to controlling and processing financial data, and that any type of data may be substituted therefor.

Figure 1:
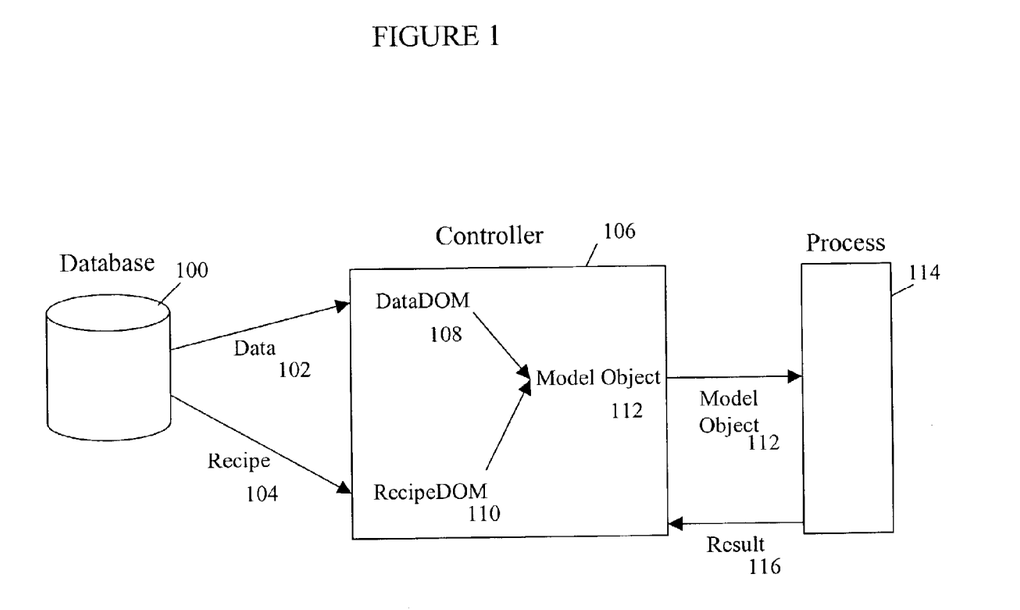
FIG. 1 shows a block diagram of the system and method for controlling communication according to an aspect of the present disclosure.

FIG. 1 shows a block diagram of the system and method for controlling communication according to an aspect of the present disclosure. The system and method of the present disclosure may operate on nearly any type of computing system or platform, at a centralized location, or with portions distributed across a network.

As shown in FIG. 1, a Controller 106 may communicate with Database 100 and retrieve Data 102 and a Recipe 104, which may be converted by the Controller 106 into DataDOM 108 and RecipeDOM 110 respectively. The Controller 106 may then create a Model Object 112 from the DataDOM 108 using the RecipeDOM 110, and may pass the Model Object 112 to a Process 114 which may return a Result 116.

Figure 2:
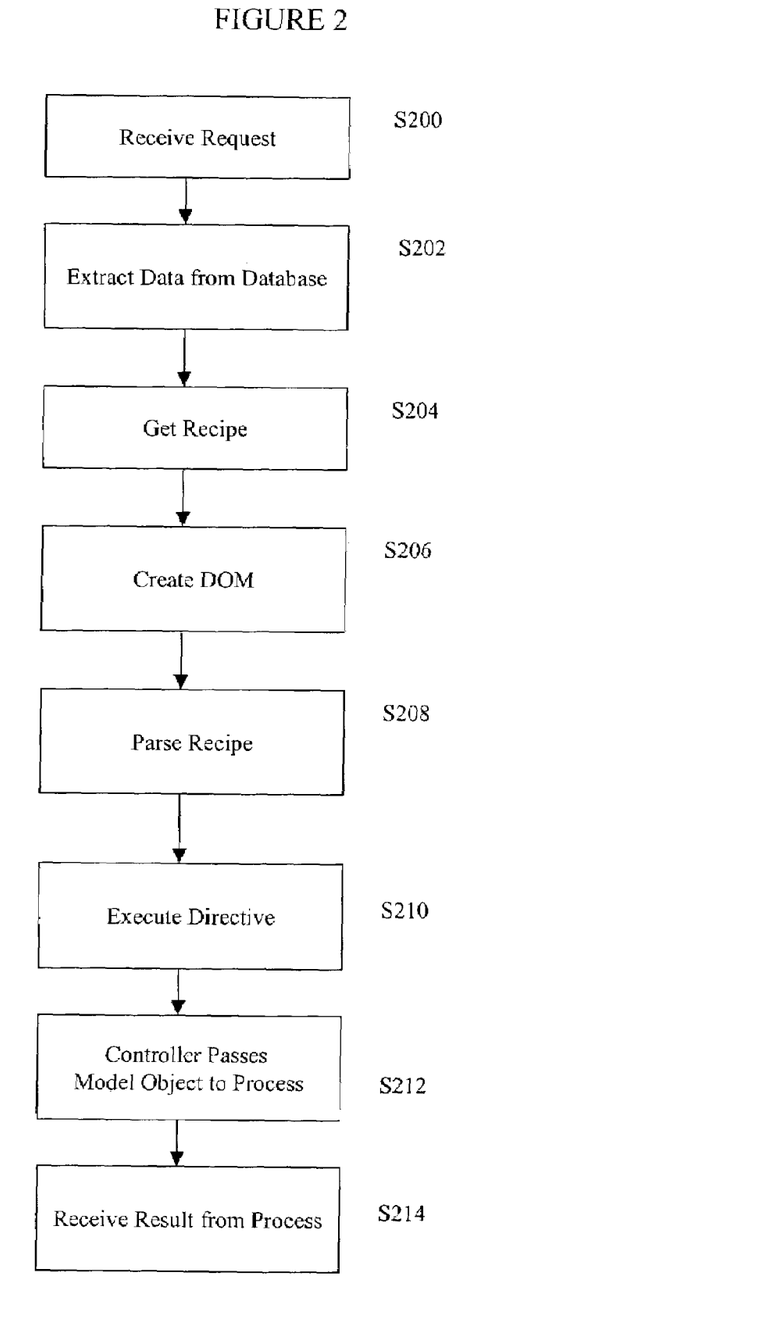
FIG. 2 shows a flowchart of the system and method for controlling communication according to an aspect of the present disclosure.

FIG. 2 shows a flowchart of the system and method for controlling communication according to an aspect of the present disclosure.

In Step S200, the system receives a request for processing that may include, for example, information identifying the Data 102 to be processed and information identifying a Process 114 for processing the Data 102. In one aspect of the system and method of the present disclosure, the Data 102 may identify the Process 114. In one aspect of the system and method of the present disclosure, the Data 102 may include one or more financial instruments to be processed, as well as other financial information, such as trading holidays, market open and close times, and current and past prices. The Process 114 may be a process for pricing the financial instruments, for example, according to sensitivities known as "Greeks". The request may include other information useful to perform processing, for example, relevant times and dates, results requested, and specific modes, such as, from a credit perspective.

In Step S202, the Controller 106 receives the request for processing and communicates with Database 100, extracting Data 102 based on the request. Data 102 may be stored as records in Database 100 and may be arranged similarly for similar financial instruments, such as single and double knockout options.

In one aspect of the system and method of the present disclosure, the Controller 106 may extract Data 102 from the Database 100 using stored procedures, and there may be no embedded Structured Query Language (SQL). The data model specifics may be encapsulated within the Database 100, and, as a result, the Controller 106 may not have knowledge of the specific internal organization of the Data 102 in the Database 100.

The Data 102 may be sent to the Controller 106 from the Database 100 in a series of self-describing record sets, for example, in which the leading row of the record set may identify the nature of the data which follows. These self-descriptor records may include, for example, information identifying a path from a root node where the data belongs.

The translation of Data 102 from the format found in the Database 100 into the Model Object 112 suitable for use by the Process 114 may be controlled and defined by one or more directives included in the Recipe 104.

In Step S204, the Controller 106 finds the appropriate Recipe 104 corresponding to the Data 102 selected for processing and the selected Process 114.

A Recipe 104 is a set of one or more directives used to translate Data 102 into a Model Object 112 for use with a selected Process 114. In one aspect of the system and method of the present disclosure, the structure and content of Recipe 104 may depend on both Data 102 and Process 114.

The Recipe 104 may be implemented as Extensible Markup Language (XML) text files; however, it may not necessarily be "well-formed" XML, and other formats may be used including self-describing record sets. The Controller 106 may use standard XML parsers to traverse and tokenize the Recipe 104, and a tree nature may reflect the structure used by the Recipe 104.

The Controller 106 may use the Recipe 104 to control the transformation of the Data 102 retrieved from the Database 100 and held in the DataDOM 108 into a Model Object 112 that the Process 114 can use. In one aspect of the system and method of the present disclosure, the Recipe 104 may be stored in the Database 100.

In one aspect of the system and method of the present disclosure, for each Process 114, there may be a Recipe 104 for each Data 102 related to a financial instrument or financial instrument type. In another aspect of the system and method of the present disclosure, for each Process 114, there may be a Recipe 104 containing or referencing one or more Sub-recipes corresponding to Data 102 related to financial instruments or financial instrument types. In yet another aspect of the system and method of the present disclosure, for a given Process 114, Data 102 related to a financial instrument may have a different Recipe 104 or Sub-recipe based on whether the instrument is a standalone instrument or if it is the underlying of another type of instrument.

Because a Recipe 104 is closely correlated with the Data 102 and Process 114, it follows that changes to Data 102 or to the Process 114 may require changes to a corresponding Recipe 104.

In Step S206, the Controller 106 may place the Data 102 retrieved from the Database 100 into a DataDOM 108, which is an instance of a Document Object Model (DOM) and may be represented, for example, in a tree-style data structure. The Controller 106 may do the same with the Recipe 104, placing it into a RecipeDOM 110. In another aspect of the system and method of the present disclosure, the Data 102 or Recipe 104 may be stored in the Database 100 in DataDOM 108 and RecipeDOM 110 formats, respectively.

The DOM format used for the DataDOM 108 and RecipeDOM 110 may be an open and public specification and may be searchable, for example, by an XML parser. DataDOM 108 may include fields of data identified by tags that may be used as reference points by RecipeDOM 110.

In Step S208, the RecipeDOM 110 may be applied to a standard XML parser, which may traverse each line of the RecipeDOM 110, tokenizing the line. The Controller 106 may then act as an interpreter, extracting from the RecipeDOM 110 the recipe directive, that is, the name of the XML tag, which may be text adjacent to the opening angle bracket. For example, the XML text "<datadict value='Holiday'>" includes the recipe directive "datadict", which indicates construction of a Model Object 112, for example, a models data dictionary object, of type 'Holiday'.

In Step S210, the Controller 106 may execute a block of code specific for each recipe directive. This code may be written in any programming language, for example, C++, Java, C#, etc. A list of example directives and their actions is attached as Appendix A.

Directives found within the RecipeDOM 110 may define variables and data structures, for example, arrays, strings and Boolean, for the Model Object 112 and may assign to those variables a predetermined value or a value found in the DataDOM 108. In one aspect of the system and method of the present disclosure, the directives may also include decision-making logic.

In another aspect of the system and method of the present disclosure, RecipeDOM 110 may also contain operations, for example, the "select" operation. For example, in the RecipeDOM 110, the text "<string key='name' select='@filename'/>", the "string" directive causes creation of a string variable in the Model Object 112, the "key" directive creates a string field named "name", and "select" assigns to the string the value found in the "filename" field of the DataDOM 108. The "select" operation specifies a path attribute, which may be absolute or relative to the current position in the DataDOM 108, identifying the data to be read.

In this example, in the text "<array child='holiday' dt='DateTime' key='Holidays' man='y'/>", the "array" and "key" directives create in the Model Object 112 an array named "Holidays", whose array contents are children having the tag "holiday" ("child='holiday'"), the "dt" directive identifies the datatype of array elements, which will be of type "DateTime", and the "man" directive indicates that the array is mandatory or required to form a complete valid object.

Continuing the example, in the text "<DateTime select='@holDate' time='EOD'/>", "DateTime" refers to the DateTime array described above within the Model Object 112, the "select='@holDate'" operation tells the interpreter to create a "DateTime" entry in the array "Holidays" and to set the value of that entry to the "holDate" value in the DataDOM 108. The interpreter may parse the DataDOM 108 and create one entry in the array "Holidays" for each "holDate" value found in the DataDOM 108.

In Step S212, the controller may pass the Model Object 112 to the selected Process 114 where Result 116 is calculated.

The Model Object 112 may be, for example, data dictionaries, i.e. a nested tree structure where elements may be atomic types (doubles and strings), arrays or other data dictionaries.

In Step S214, the Result 116 of the Process 114 is passed to the Controller 106, which may perform post-processing manipulation, for example, free-formatting or scaling, before providing the Result 116 to the user.

Fixed and Dynamic Recipes

As described above, in Step S204 the Controller 106 may locate the appropriate Recipe 104 corresponding to the selected Data 102 and Process 114. A Fixed Recipe may be used when the structure and content of Data 102 is known and, therefore, may provide directives for appropriately handling the Data 102.

When the Controller 106 encounters Data 102 and does not have a corresponding Recipe 104 with which to prepare a Model Object 112 for a selected Process 114, a Dynamic Recipe or RecipeDOM may be created and may be saved or discarded after use. A Dynamic Recipe may provide a flexible and generalized form of the recipe concept and may be applied to Data 102 which does not have a "rigid" or predefined structure. In one aspect of the system and method of the present disclosure, an example of Data 102 which does not have a predefined structure is a "generic financial instrument". Generic financial instruments may have data fields with undefined tags.

Generic financial instruments may be instances of a class, for example, OTC Vanilla, where the class definition, for example, market data, option date, etc., is formed of pre-existing components. In one aspect of the system and method of the present disclosure, the class definition for generic financial instruments may be created and modified and may be stored in the Database 100, for example, as meta-data.

In another aspect of the system and method of the present disclosure, the class definition for fixed, non-generic instruments may be held in a models library data structures in code.

Figure 3:
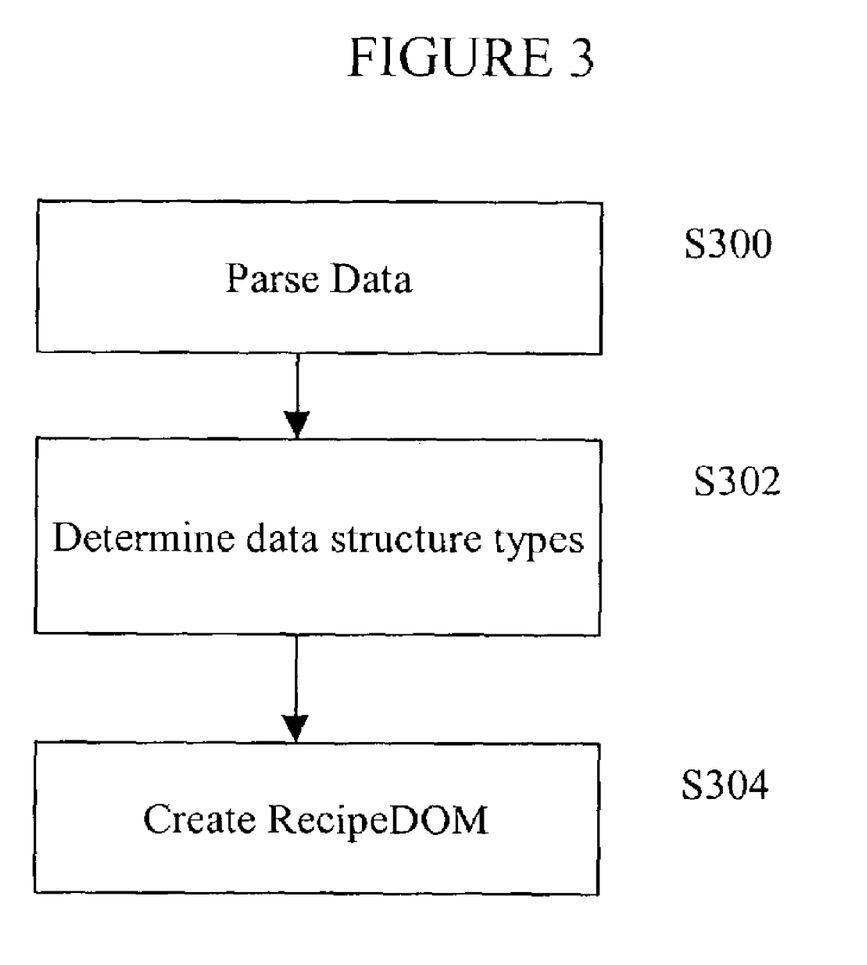
FIG. 3 shows a flowchart for creating dynamic recipe according to an aspect of the present disclosure.

FIG. 3 shows a flowchart for creating a Dynamic Recipe according to one aspect of the present disclosure.

In Step S300, the Controller 106 may parse the Data 104 to extract the meta-data that describes a specific generic instrument instance. The Controller 106 may interrogate the Database 100 to get the instrument definition. In one aspect of the system and method of the present disclosure, the Controller 106 examines the set of objects used to create the DataDOM 108, for example, examining the top-level children of the DataDOM 108 and may build a RecipeDOM 110 based on the set of objects.

Fixed Recipes may be created by interrogating a models library for the definition of the data structure of the fixed instrument class with which they will be used. To alter the definition of a fixed instrument class, the models library may be changed and re-interrogated to re-create the revised Fixed Recipe. An equivalent change to the dynamic class definition in the Database 100 may automatically be referenced on the next and subsequent recipe demand and creation.

Generic class definitions for generic instruments may be formed of fundamental data structure types, for example, strings, Boolean, arrays, etc., and the components defined that may be used to create the generic class may be a specialization of one or more of these fundamental data structure types. For example, a yield curve object and dividend lists are specializations of a pair of arrays, one array storing dates and the other storing corresponding values.

In Step S302, the Controller 106 may determine which data structure types and specializations are included in the generic class definition. The Controller 106 may sort through the generic class definition to identify the data structure types and specializations.

In Step S304, the Controller 106 may create a RecipeDOM 110 representation of a specific structure which may then be applied against the DataDOM 108 in a manner similar to a Fixed RecipeDOM.

In one aspect of the system and method of the present disclosure, the Controller 106 may create a RecipeDOM 110 including directives and operations based on the data structure types and specializations identified in Step S302, and which may be used to convert the DataDOM 108 into a ModelObject 112 for use with a selected Process 114.

In another aspect of the system and method of the present disclosure, the Controller 106 may create and insert an appropriate data dictionary portion into the newly created Dynamic RecipeDOM based on the data structure types and specializations identified in Step S302. The Controller 106, upon encountering the data dictionary may populate the data dictionary, for example in the case of a yield curve object or dividend list described above, with a pair of arrays from Data 102. This operation may be the same for both Dynamic and Fixed Recipes. As described above, it is the presence of the finite set of objects, such as data structure types and specializations, used to describe the generic instrument which allows the formation of Dynamic Recipe.

Numerous additional modifications and variations of the present disclosure are possible in view of the above-teachings. It is therefore to be understood that within the scope of the appended claims, the present disclosure may be practiced other than as specifically described herein.

Appendix A

A. Recipe Directives

1. Append

Usage: <append value="/DefaultEDRControl"/>

Makes a copy of the node specified by the value and inserts it as a child of the current node.

2. Array

Usage: <array key='expiries' context='volCurve' child='volPoint' dt='Expiry' sort='matDays' man='y'>

Creates an array object with the name as given by the key value. The context specifies a relocation (in this case simply to a child node). The child attribute identified the tag name of the lines that contain the data from which the array is to be constructed. The dt specifies the array element data type. Sort indicates that the array is to be sorted by that attribute value.

Recipe:
<array dt = "Double" key = "rates" sort = "matDays" child = "curvePoint">
  <double select = "@rate" percent = "Y"/>
</array>

Data: Rate curve with Mat points

First the interpreter calls EASNodeVector::addNamedChildren( ) to add to a vector all the child nodes of borrowingCurve in current DOM node that have the tag curvePoint (the child attribute). Then EASSortedNodeVector::mergeSort( ) is called to order the nodes in that vector by the value of the matDays attribute.

Note that in this case, matDays is an artifice to enable sorting of the maturity periods. Maturity periods are 1M, 3M, 6M, 1Y, 3Y etc and as simple strings will not sort into the right order. The matDays is added by the stored procedure to give an ascending number on which sorting can take place by proxy.

A models array object of type Double (dt attribute) and of the correct size is created. The name of the array is rates. It is then populated by traversing the (now sorted) vector of nodes, applying the child of the array declaration in the recipe

```
<double select="@rate" percent="Y"/>
``` as a recipe to the node from the vector such as

```
<curvepoint rate="{number}" matDays="1"
    matPeriod="ON"/>
```

This may create a double object for the rate value of each child of the borrowCurve and adds it by index into the array object.

3. Boolean

```
Usage:    <boolean key='fwdStarting' select='effective/@isFwdStart'
test='Y'/>
<boolean key='accrueIRonFullNotional'
select='accrueIRonFullNotional/@boolean'/>
<boolean value='0'/>
```

Creates a Boolean object with a name specified by key. The false/true state can be specified by value being zero or unity, or by the zero/unity value at the select location. If zero/unity are not the logical data provided, the value or select value can be compared to test value.

EXAMPLE

Recipe: <boolean key="isCall" test="C" select="@claim"/>

4. Cache
Usage: <cache key='model' select='modelType/@doc'/>

Creates a models object with name key working from the node specified by select. The resulting object is held in cache.

EXAMPLE

Recipe: <cache key="model" select="modelType/@doc"/>

This creates an models object to add to the models object cache by interpreting the top-level child node with the name MP-40004399 (dataDOM line 345) as selected by the modelType/@doc path See the sample model object section for further details 5. Case
Usage: <case equals='ON'>

A labeled block of statements referenced within a switch statement. See switch. It should be noted that a case statement (as with all directives) can only return one object: therefore if a case situation required multiple objects, the switch statement has to be repeated for each object.

6. Clonemarketcache
Usage: <clonemarketcache value='MarketData' key='market' man='y'/>

Performs a shallow copy, with the new name of value of the key attribute, of the models market cache object named value. The man flag being 'Y' indicates that this copy is a mandatory requirement 7. Easdict

```
Usage:
<easdict>
    <string key="pp" value="rm"/>
    <import key="instrument" recipe="recipe/AssetValueRecipe.xml" />
    <cache key='model' select='IND/modelType/@doc' />
</easdict>
```

This is a non-models collection of models objects, i.e. a private, Analytics data dictionary and is used to hold a private collection of models objects (in this case an instrument object and a model object).

8. Datadict

```
Usage: <datadict value='PayStream' key='payStream' man='y'>
    <datadict context='TR1F' value='Tree1fLN'>
        <datadict value='Tree1fLN'>
        <datadict value='Fund' cache_add="y"
            cache_add_key_prefix="Fund-">
```

This is a models object collection container. It causes a models data dictionary object to be created with the name key or causes a cached object with name value to be found. The context parameter causes the current working location in the DOM to be moved to that specified. If the object is mandatory, man is 'y'. Implemented by EASXtoEDRModel::interpretContainerChildren( ).

The special case of cache_add is used to specify that this market data should also be added to the models objects cache as well as to the models market data cache. The prefix is pre-pended to the treeid tag to make a distinctive name.

EXAMPLE

```
Recipe:
<datadict value = "Holiday">
    <string key = "name" select = "@fileName"/>
    <boolean key = "useWeekends" value = "1"/>
    <array dt = "DateTime" key = "holidays" man = "y"
        child = "holiday">
        <datetime time = "EOD" select = "@holDate"/>
    </array>
</datadict>
Data:
<holidayList treeid = "holiday-USEXCH"
fileName = "holiday-USEXCH">
    <holiday treeid = "holiday-USEXCH" holDate = "19991125"/>
    <holiday treeid = "holiday-USEXCH" holDate = "20000117"/>
    <holiday treeid = "holiday-USEXCH" holDate = "20000221"/>
    <holiday treeid = "holiday-USEXCH" holDate = "20000421"/>
    ...
    <holiday treeid = "holiday-USEXCH" holDate = "20041225"/>
</holidayList>
```

Creates a data dictionary object of type Holiday and contains three elements:- a name string "holiday-USEXCH", a Boolean to indicate whether to use weekends (true) and an array of dates.

9. Datetime

```
Usage: <datetime select='@datetime'/>
    <datetime select='@initialRefixDate' time='EOD'/>
    <datetime key='consoliDate' select='consoliDate/@datetime'/>
    <datetime key='baseDate' select='../@valueDate'
        timepath='../@valuationTime'/>
```

Creates a models datetime object. The first two formats are used in schedules where the object is anonymous (just one of the schedules dates). The value at the select location specifies the date element. The time can be hard coded or reference the value at the timepath location. The key value specifies the name of a standalone object

EXAMPLES

Recipe:
 <datetime select = "@date" timepath = "../exchangeEvent/@dayPart"/>
Data: (data DOM line 148)
 <strike date = "19990726" strike = "#"/>

The timepath resolves to data DOM line 150

<exchangeEvent spn = "0266922" ampm = "P" timing = "CLOS" dayPart = "EOD" reuters = "N"/> so the datetime object will represent EndOfDay, 26$^{th}$ Jul. 1999

10. Double

Usage: <double select='@initialSpot'/>
 <double key='spotFX' select='@spotFX'/
 <double percent='Y' select='@spread'/>

Creates a models object containing a double value found at the select location. Key specifies the name if a standalone object (i.e. not an entry in an array/schedule). The percent parameter can be used to identify those values held in the DOM as a percentage rather than actual value.

EXAMPLE

Recipe: <double key = "stockPrice" select = "price/@price"/>
Data:
<equity treeid = "equity-466">
  <equityI treeid = "equityI-466">
    ...
  </equityI>
  <dividends treeid = "equity-466">
    ...
  </dividends>
  <borrowingCurve dcc = "Actual/365F"...>
    ...
  </borrowingCurve>
  <price price = "#" treeid = "equity-466"
    exchange = "NYSE" valuationRule = "REF"/>
  <STK treeid = "equity-466"...>
    ...
  </STK>
</equity> creates a double object with a name of "stockprice" and value #

PERCENT EXAMPLE

Recipe: <double select="@rate" percent="Y"/>
Data:
<curvePoint rate="#" matDays="1" matPeriod="ON"/> creates a models double object with value=#—i.e. rate/100.

11. Doublematrix

Usage: <doublematrix key='vol' row='volCurve' point='volPoint'
 item='@volatility' rowSort='strike' colSort='matDays' man='y'/>

Creates a models matrix object holding a grid of double values. The name of the object is specified by key. The row value gives the tag name of the nodes children containing the data to go into the object. The actual double value is found within those children as attribute named by item. The sequence of the rows and columns are specified by sorting the values contained in the rowSort and colSort attributes. If the object is mandatory, this s specified by man.

EXAMPLE

Recipe:
 <doublematrix key = "vol" man = "y" row = "volCurve"
  item = "@volatility" point = "volPoint" colSort = "matDays"
   rowSort = "strike"/> data:
Volatility Curve Points–Mat days

A models doubleMatrix object is created

A vector of row nodes is created by EASNodeVector::addNamedChildren( ) picking all the volCurve nodes (i.e. the row attribute value) of which, in this case is only one node. This row vector is sorted on the strike values of each of the nodes in the vector (i.e. rowSort attribute value). The row vector is then iterated in sequence and the iterated node is then handled as an array: all the volPoint (i.e. the point attribute value) nodes are added to a temporary column vector which is then sorted using the proxy matDays (colSort attribute value).

In turn each volPoint node is searched for the value of the item specified attribute (volatility), and that value set at the row/col location in the matrix object.

12. Exists

Usage <exists key='rateDCC' test='floatingRate/@DCC'>
 <exists select='.' key='startDate' test='effective/@date'>
 <exists context='dividends' key='synthDivs' test='dividend/@exDate'

Effectively a logical if statement—the child of this element are only parsed if there is an attribute at the location test but does not fail if it is missing. This path may be re-based by the select or context values. The name of an object created from the child of this exist can be specified by key although it would be more logical to give the child attribute the key entry.

EXAMPLE

```
<exists key = "startDate" test = "effective/@date" select=".">
    <datetime select = "effective/@date" timepath =
    "effective/@dayPart"/>
</exists>
``` on data node

```
<OTC-VAN claim = "C" style = "A...>
    <premium date = "19991124" treeid = "EQD-40004399"/>
    ...
    <effective treeid = "EQD-40004399" isFwdStart = "N"/>
    ...
</OTC-VAN>
``` the date attribute does not exist in the effective tag so the datetime line of the recipe will not be executed.

13. If

Usage: `<if key='callDate' test='@callable' equals='Y'>`

A similar test as exists but will fail if the test attribute is not present. The child elements of this tag are executed if the value in test matches the value in equals. Key is the name of any object created within the sub-block.

EXAMPLE

```
Recipe:
    <if test = "@optionType" equals = "CVB">
        <append value = "/DefaultEDRControl"/>
    </if>
```

Here the value of the optionClass attribute is not "CVB" so the append directive will not be executed.

14. Import

```
Usage: <import key="instrument" recipe="recipe/compRecipe.xml"/>
       <import context='samples'
       recipe='recipe/SampleListRecipe.xml'/>
```

Causes the specified recipe to be parsed at this point. Effectively a function call. Optionally can transfer the current data node to context. Each import creates its own private interpreter in order to preserve the outer, calling, interpreter. DOMs created from recipes are held in a cache to avoid repeated recipe file reads & transformation into DOMs.

15. Integer

```
Usage: <integer value='5000'/>
    <integer key='accrueDivType' value='0'/>
        <integer key='payStyle' select='@payStyle'/>
        <integer key="offset" variable="@className" variable_select=
        '../../controlOverride/$variable$/shift/@offset'/>
```

Creates a models object holding an integer value specified either literally by value or by the content of the select attribute. The name of the standalone object can be given by key. The last form is a special parameterized selected statement. The expression $variable$ is replaced by the content of the variable attribute.

EXAMPLE

```
Recipe: <integer key = "period" select = "eqSettleRoll/@period"/>
Data:
    <eqSettleRoll period = "3" />
```

Creates an integer object with name "period" and value 3.

16. Marketcache

```
Usage: <marketcache select='@currency'/>
    <marketcache key='marketHols' value='holiday-NONE'
    <marketcache key='discount' select='ccyLink/@ref'/>
```

Reuses or creates a models object that is held in/passed to the models market data cache (i.e. not held within the Analytics cache). The select attribute value is referenced so models internally extract that named object or an object is created with the name given by key parsing the node specified by select. The key is ignored.

The market cache is held within the library and other than being able to add objects, it may be inaccessible. This means that it may not be interrogated to discover if an object already exists. In order to avoid duplicate constructions, may keep separate list of the names of objects put into their cache

EXAMPLE

```
Recipe:    <marketcache key = "hols" select = "eqSettleHol/@ref"/>
Data:
<eqSettlement bdc = "None" delivery = "physical" exchange = "NYSE">
    <eqSettleHol ref = "holiday-USEXCH" treeid = "equityI-466"/>
    <eqSettleRoll period = "3" treeid = "equityI-466" effDate =
    "19940101"/>
    <eqSettlementType treeid = "equityI-466" settleType = "T"/>
</eqSettlement>
```

Creates (assuming not previously created & cached) a models object by parsing the "holiday-USEXCH" top-level child node (data DOM line 244)

17. Maturityperiod

Usage: `<maturityperiod select='@matPeriod'/>`

Gets the maturity bucket value ('1M', '3M', '20Y' etc) value specified by the attribute at select.

EXAMPLES

```
Recipe: <maturityperiod select = "@matPeriod"/>
Data:   <curvePoint rate = "#" matDays = "X"
        matPeriod = "1M"/>
```

Creates a models object of type maturityPeriod with a value of "1M".

18. Mattimeperiod

```
Usage: <mattimeperiod select='@matPeriod' time='EOD'/>
       <mattimeperiod key='expiry' select='@matPeriod' time='EOD'/>
```

Creates a models object holding a maturity date time. The object holds the bucket label of the select attribute with a time-of-day flag given by the time value. The name of the object can be specified by key.

EXAMPLE

```
Recipe: <mattimeperiod time = "EOD" select = "@matPeriod"/>
Data:   <volPoint matDays = "7" matPeriod = "1W"
        volatility = "#"/>
```

Creates a models maturity time period object with values '1W' and 'EOD' (from the time attribute value)

19. Mudates

Usage: <mudates key='expiries' value='SPECIAL'/>

Creates a models object identifying a set of MU dates with the name given by key and the set of dates identified by value text.

20. String

```
Usage: <string key ='interp' value='N'/>
       <string key='period' select='@matPeriod'/>
```

Creates a models object containing the string text given by value or the value of the select attribute.

EXAMPLES

<string key="pp" value="rm"/>

Creates a models string object containing "rm"

```
Recipe: <string key = "name" select = "@fileName"/>
Data:   <holidayList treeid = "holiday-NONE" fileName =
        "holiday-NONE"/>
```

The string object has the name 'name' and text "holiday-NONE" from the filename attribute. (Originally holiday lists were held in files hence the legacy of 'filename')

21. Switch

```
Usage: <switch test='@averagingType'>
       <switch key='rateBadDayConv' test='@bdc'>
       <switch test="<NAME>" hash='y'>
```

Performs the function of, for example, a C++/Java switch statement where block of statements identified by a case label, denoted by the equals value, that matches the test value. The name of an object created within that case block can be named via key. Note: whilst there is support for a default case, this should only be used to flag an error. Also, the concept of 'fallthrough' may not exist so there are no 'break' statements.

The hash variant is a special situation, may be used only in the metaRecipe, to denote that the necessary node may already be in the meta recipe cache & should be added on creation if not. Note the < and > are special XML directives to specify the <and> symbol within text fields.

EXAMPLE

```
Recipe:
  <switch key = "Asset" test = "equityI/illiquidEquity/@illiquid">
    <case equals = "Y">
      <import recipe = "recipe/IlliquidStockRecipe.xml"/>
    </case>
    <case equals = "N">
      <import recipe = "recipe/equityRecipe.xml"/>
    </case>
    <default>
      <writetolog text = "Unknown illiquidEquity
      flag: " select = "equityI/illiquidEquity/@illiquid"/>
    </default>
  </switch>
```

Note: data happens to be duplicated, takes first one only. In this case the test value is 'N' so the equityRecipe will be imported, not the IlliquidStockRecipe.

22. Writetololg

Usage: <writetolog text='Unknown weightType:' select='@(weightType'/>

Causes an entry to be written into the log file, reporting the text information augmented with the value of the select attribute.

23. Xlatrecipe

Denotes a recipe. The interpreter calls EASXtoEDRModel::interpretChild( ) to traverse all the child nodes of the recipe and apply to the current data node

What is claimed is:

1. A method of transforming data retrieved from a database into a data object usable by a requested computing application, comprising:
(a) receiving a request including information defining the data to be retrieved from a database and information defining the computing application which utilizes the data;
(b) retrieving the data from the database, based on the information defining the data in the request;
(c) selecting an appropriate recipe, which comprises computer-executable directives used to translate the retrieved data into the data object for use with the requested computing application
(d) generating the data object by executing the selected recipe by means of a computer; and
(e) performing the requested computing application by utilizing the translated data.

2. The method of claim 1, where the step of selecting an appropriate computer-executable recipe includes:
(a) parsing the data retrieved from the database;
(b) determining a data class based on the data and the information defining the data in the request;
(c) identifying objects within the parsed data;
(d) accessing meta-data which defines a structure of the data class; and
(e) selecting an appropriate computer-executable recipe based on the identified objects, the requested computing application, and the meta-data.

3. The method of claim 1, wherein the request includes information useful for performing the computing application comprising relevant times and dates, results requested, or specific modes.

4. The method of claim 1, wherein the selected computer-executable recipe includes a reference to one or more additional sub-recipe(s) for further generating the data object.

5. The method, of claim 1, wherein the computing application is a computing process to utilize the retrieved and transformed data to valuate a financial instrument.

6. The method of claim 1, wherein the data is financial instrument data.

7. Computer executable software code, the code for transforming data retrieved from a database into a data object usable by a requested computing application, comprising:
   (a) code for receiving a request including information defining the data to be retrieved from a database and information defining the computing application which utilizes the data;
   (b) code for retrieving the data based on the information defining the data in the request;
   (c) code for selecting an appropriate recipe, which comprises computer-executable directives used to translate the retrieved data into the data object for use with the requested computing application;
   (d) code for generating the data object by executing the selected recipe by means of a computer; and
   (e) performing the requested computing application by utilizing the translated data.

8. The computer executable software code of claim 7, where the code for selecting an appropriate computer-executable recipe includes:
   (a) code for parsing the data retrieved from the database;
   (b) code for determining a data class based on the data and the information defining the data in the request;
   (c) code for identifying objects within the parsed data;
   (d) code for accessing meta-data which defines a structure of the data class; and
   (e) code for selecting an appropriate computer-executable recipe based on the identified objects, the requested computing application, and the meta-data.

9. The computer executable software code of claim 7, wherein the request includes information useful for performing the computing application comprising relevant times and dates, results requested, or specific modes.

10. The computer executable software code of claim 7, wherein the selected computer-executable recipe includes a reference to one or more additional sub-recipe(s) for further generating the data object.

11. The computer executable software code transmitted as an information signal of claim 7, wherein the computing application is a computing process to utilize the retrieved and transformed data to valuate a financial instrument.

12. The computer executable software code of claim 7, wherein the data is financial instrument data.

13. A programmed computer system including a program for transforming data retrieved from a database into a data object usable by a requested computing application, comprising:
   (a) means for receiving a request including information defining the data to be retrieved from a database and information defining the computing application which utilize the data;
   (b) means for retrieving the data from the database based on the information defining the data in the request;
   (c) means for selecting an appropriate recipe, which comprises computer-executable directives used to translate the retrieved data into a data object for use with the requested computing application;
   (d) means for generating the data object by executing the selected recipe by means of a computer; and
   (e) means for performing the requested computing application by utilizing the translated data.

14. The programmed computer system of claim 13, where the means for selecting a computer-executable recipe includes:
   (a) means for parsing the data retrieved from the database;
   (b) means for determining a data class based on the data and the information defining the data in the request;
   (c) means for identifying objects within the parsed data;
   (d) means for accessing meta-data which defines a structure of the data class; and
   (e) means for selecting an appropriate computer-executable recipe based on the identified objects, the requested computing application, and the meta-data.

15. The programmed computer system of claim 13, wherein the request includes information useful for performing the computing application comprising relevant times and dates, results requested, or specific modes.

16. The programmed computer system of claim 13, wherein the selected computer-executable recipe may include a reference to one or more additional sub-recipe(s) for further generating the data object.

17. The programmed computer system of claim 13, wherein the computing application is a computing process to utilize the retrieved and transformed data to valuate a financial instrument and the data is financial instrument data.

* * * * *